United States Patent Office 2,752,355
Patented June 26, 1956

2,752,355
PROCESS FOR THE PREPARATION OF NICOTINAMIDE

Otto Lustig, New York, N. Y.

No Drawing. Application May 28, 1954,
Serial No. 433,260

6 Claims. (Cl. 260—295.5)

The present invention relates to a process for the preparation of nicotinic acid amide (nicotinamide) and is an improvement over the methods hitherto described for the preparation of the said amide by its simplicity and inexpensiveness. The product obtained by this novel process is of high purity, the nicotinamide complying with the specifications of the U. S. Pharmacopoeia. The yields are quantitative.

Up to now, nicotinamide has been prepared by the action of ammonia or urea on nicotinic acid, with or without pressure, at high temperatures, or by partial hydrolysis of nicotinic acid nitrile. The crude nicotinic acid amide obtained according to these methods is contaminated by impurities, primarily by nicotinic acid. The separation of nicotinamide from nicotinic acid encounters considerable difficulties and causes expenses.

Other methods described in the literature relate to the reaction of nicotinic acid esters with aqueous or alcoholic ammonia under varying conditions. In spite of long reaction periods, comprising 3 to 5 days, the yields are low, the resulting amides are contaminated with unreacted ester which has to be removed by extraction. Only repeated recrystallization gives a pure product. In order to obtain satisfactory quantities, i. e. yields of 75% of the theory, repeated reaction of the ester is necessary.

The object of the present invention is to overcome the drawbacks outlined above and to provide the preparation of nicotinamide by simple and economical measures.

According to this invention, this is accomplished by reacting nicotinic acid esters at room temperature or slightly raised temperatures in aqueous or alcoholic solution with ammonia in the presence of a catalyst, whose action reduces the time of reaction to less than 24 hours and accomplishes quantitative conversion.

The reagent is concentrated ammonia, or saturated alcoholic ammonia, or a mixture of both. An excess of the solvent is preferably used, so that after the completion of the reaction the formed amide will be in solution, to facilitate the filtration of the catalyst.

The starting material is an ester of nicotinic acid with a lower molecular alcohol, such as methyl, ethyl, propyl, butyl, amyl, cyclohexyl, tetrahydro furfuryl, or similar alcohols, preferably an ester of low boiling point, which is in liquid state at room temperature; examples are ethyl, propyl, or isopropyl nicotinate. These esters are, after vacuum distillation, colorless liquids possessing a characteristic odor. They are not soluble in aqueous ammonia.

As stated above, the reaction is carried out in the presence of a catalyst of the type of a metal (powder), preferably comminuted aluminum. The amount of the catalyst employed may vary widely, but in general between 0.01 and 0.5 gram atom of aluminum per mol of ester is satisfactory.

The fact that the reaction takes place at room temperature or at slightly raised temperatures makes the process exceedingly simple. The preferred temperatures are between 10 and 50° C.

The process according to the invention will now be described in a number of examples, but it should be understood that these are given by way of illustration and not of limitation and that many changes in the details can be made without departing from the spirit of the invention and the scope of the appended claims. Parts are in the decimal system, by weight, only $NH_3$ is given by volume.

Example 1

In a suitable vessel provided with a stirrer, a mixture of 1000 parts of aqueous, concentrated ammonia, 200 parts of ethyl nicotinate, and 10 parts of aluminum powder is stirred for 6–12 hours at a temperature of about 15–35° C. Thereafter, the metal powder is carefully filtered off, if necessary with addition of 2 parts of activated carbon. The clear filtrate is then evaporated to dryness.

The remaining product is nicotinamide in the form of white, odorless crystals, which when dried over conc. sulfuric acid has a melting point of 131–133° C.

The aqueous solution exhibits neutral reaction to litmus paper. The product is completely in accordance with the requirements set up by the U. S. Pharmacopoeia. The yield is almost quantitative (158–160 parts). Not even traces of nicotinic ester were found in the product.

Example 2

In a vessel as described in Example 1, a mixture of 1000 parts of aqueous, concentrated ammonia, 220 parts of isopropyl nicotinate, and 9 parts of granulated aluminum, is well stirred for 12–18 hours, at a temperature of 15–25° C.

The further treatment is the same as the one described in Example 1.

The nicotinamide is obtained in almost theoretical yield in the form of white, odorless crystals free of any trace of the ester.

Example 3

In a vessel provided with a stirrer, a mixture of 210 parts of isopropyl nicotinate, 1000 parts of aqueous, concentrated ammonia, and 9 parts of granulated aluminum are vigorously stirred for 9–15 hours at a temperature of 30–40° C. Thereafter, the metal catalyst is filtered off, if necessary with the addition of a small amount of activated carbon; the resulting, clear filtrate is cooled down in the course of several hours to about 0 to 10° C., while being slowly stirred. During this operation, about 60% of the nicotinamide formed during the reaction separates out in crystallized form and is subjected to centrifuging. The crystals thus obtained are dried at about 40° C.; they amount to about 100–110 parts of pure nicotinamide.

The mother liquor, which contains some alcohol formed from the ester by ammonolysis, is preferably not evaporated, but saturated with gaseous ammonia at a low temperature, e. g. 0 to 10° C. and is then used for preparation of nicotinamide in a subsequent operation.

Example 4

The procedure is the same as described in Example 3, with the difference that instead of isopropyl nicotinate, ethyl nicotinate is treated as described in the said example.

In this case, too, the main part of the nicotinamide formed in the reaction is isolated by centrifugation, while the mother liquor is used after saturation with gaseous ammonia for the preparation of the next batch of nicotinamide.

Instead of using the ethyl or isopropyl esters of nicotinic acid, I may also use the equivalent quantities of other esters of monohydric alcohols, more particularly saturated aliphatic, hydroaromatic, and heterocyclic alcohols containing from 1-8 carbon atoms, all of which give very satisfactory yields in pure nicotinamide.

What I claim is:

1. A process for preparing nicotinamide, which comprises reacting a nicotinic acid ester of a saturated monohydric alochol selected from the group consisting of methyl, ethyl, propyl, butyl, amyl, cyclohexyl, and tetrahydrofurfuryl alcohols with ammonia at temperatures ranging from 10–50° C. for less than 24 hours in the presence of aluminum as a catalyst, and isolating the nicotinamide in crystallized form.

2. A process for preparing nicotinamide, which comprises reacting ethyl nicotinate with a concentrated ammonia solution at a temperature ranging from 10–50° C. for 6–12 hours in the presence of aluminum powder as a catalyst, filtering the reaction mixture, and evaporating the filtrate to dryness.

3. A process for preparing nicotinamide, which comprises reacting ethyl nicotinate with a concentrated ammonia solution at a temperature ranging from 10–50° C. for 9–15 hours in the presence of granulated aluminum as a catalyst, filtering the reaction mixture, isolating the main part of the nicotinamide formed by cooling to 0–10° C., centrifuging the crystals, and using the mother liquor after saturation with ammonia for the preparation of an ensuing batch.

4. A process for preparing nicotinamide, which comprises reacting isopropyl nicotinate with a concentrated ammonia solution at a temperature ranging from 10–50° C. for 12–18 hours in the presence of aluminum powder as a catalyst, filtering the reaction mixture, and evaporating the filtrate to dryness.

5. A process for preparing nicotinamide, which comprises reacting isopropyl nicotinate with a concentrated ammonia solution at a temperature ranging from 10–50° C. for 9–15 hours in the presence of granulated aluminum as a catalyst, filtering the reaction mixture, isolating the main part of the nicotinamide formed by cooling to 0–10° C., centrifuging the crystals, and using the mother liquor after saturation with ammonia for the preparation of an ensuing batch.

6. A process for preparing nicotinamide which comprises reacting a nicotinic acid ester of a saturated monohydric alcohol selected from the group consisting of methyl, ethyl, propyl, butyl, amyl, cyclohexyl, and tetrahydrofurfuryl alcohols with a concentrated ammonia solution at temperatures ranging from 10–50° C. for less than 24 hours in the presence of comminuted aluminum as a catalyst in amounts of 0.01–0.5 gram atoms of aluminum per mol of ester, removing the catalyst, and isolating the nicotinamide in crystallized form.

References Cited in the file of this patent
UNITED STATES PATENTS

| | | |
|---|---|---|
| 2,453,706 | Garbo | Nov. 16, 1948 |
| 2,510,922 | Berg et al. | June 6, 1950 |